(12) United States Patent
Blondeau

(10) Patent No.: US 6,505,495 B1
(45) Date of Patent: Jan. 14, 2003

(54) TEST SPECIMEN

(75) Inventor: Jean Blondeau, Sinsheim (DE)

(73) Assignee: Metronom Gesellschaft fuer Industievermessung, mbH, Mainz (DE)

( * ) Notice: Subject to any disclaimer, the term of this patent is extended or adjusted under 35 U.S.C. 154(b) by 0 days.

(21) Appl. No.: 09/537,336

(22) Filed: Mar. 29, 2000

(30) Foreign Application Priority Data

Apr. 1, 1999 (DE) .......................... 199 15 012

(51) Int. Cl.$^7$ .......................... G01B 5/004; G01B 21/04
(52) U.S. Cl. .......................... 73/1.79; 33/502
(58) Field of Search .............. 73/1.79, 1.81; 33/502

(56) References Cited

U.S. PATENT DOCUMENTS

| | | | | |
|---|---|---|---|---|
| 4,054,049 A | * | 10/1977 | Egger | 73/780 X |
| 4,492,036 A | | 1/1985 | Beckwith, Jr. | 33/503 X |
| 4,837,936 A | * | 6/1989 | Lockhart | 33/502 X |
| 4,879,817 A | * | 11/1989 | McMurtry | 33/502 |
| 4,932,136 A | * | 6/1990 | Schmitz et al. | 73/1.79 X |
| 4,955,225 A | * | 9/1990 | Kriest et al. | 73/1.81 X |
| 4,962,541 A | * | 10/1990 | Zeller et al. | 73/1.79 X |
| 5,014,439 A | * | 5/1991 | Butzin et al. | 33/502 X |
| 5,014,444 A | * | 5/1991 | Breyer | 33/502 X |
| 5,187,874 A | * | 2/1993 | Takahashi et al. | 73/1.79 X |
| 5,269,067 A | * | 12/1993 | Waeldele at al. | 73/1.79 X |
| 5,465,023 A | | 11/1995 | Garnes | 313/293 |
| 5,581,012 A | * | 12/1996 | Critelli | 723/1.73 |
| 5,681,981 A | | 10/1997 | McMurtry | 73/1.73 |
| 6,023,850 A | * | 2/2000 | Trapet | 33/502 |

FOREIGN PATENT DOCUMENTS

| | | | | |
|---|---|---|---|---|
| DE | 39 38 034 | | 5/1991 | G01B/21/00 |
| DE | 4011890 A1 | * | 10/1991 | 73/1.79 |
| DE | 29708830 U1 | * | 7/1997 | G01B/5/004 |
| DE | 196 11 617 | | 9/1997 | G01B/21/04 |
| DE | 197 20 883 | | 11/1998 | G01B/5/004 |
| EP | 275428 A2 | * | 7/1988 | 33/500 |
| EP | 0 350 532 | | 1/1990 | G01B/21/04 |
| EP | 0 362 626 | | 4/1990 | G01B/21/04 |
| EP | 508686 A2 | * | 10/1992 | 73/1.79 |
| EP | 526056 A1 | * | 2/1993 | 73/1.81 |
| EP | 0 491 734 | | 10/1994 | G01B/21/04 |
| JP | 61-193003 | * | 8/1986 | 73/1.81 |
| JP | 4-69492 | | 3/1992 | B65D/57/00 |
| JP | 4-69493 | | 3/1992 | F16L/59/12 |

\* cited by examiner

*Primary Examiner*—Thomas P. Noland
(74) *Attorney, Agent, or Firm*—IP Strategies P.C.

(57) ABSTRACT

A test specimen includes four sensed elements and six connection elements for connecting the sensed elements, the sensed elements being releasably connectable by the connection elements in such a way that each sensed element touches precisely three connection elements at the end faces thereof and that the sensed elements and the connection elements in their entirety form a tetrahedron on the corners of which the sensed elements are arranged. The material and/or the dimensions of the sensed elements and the material and/or the dimensions of the connection elements are adapted to one another in such a way that, under standard measurement conditions, the total coefficient of linear expansion from one sensed point to the next sensed point on different sensed elements is essentially zero.

17 Claims, 1 Drawing Sheet

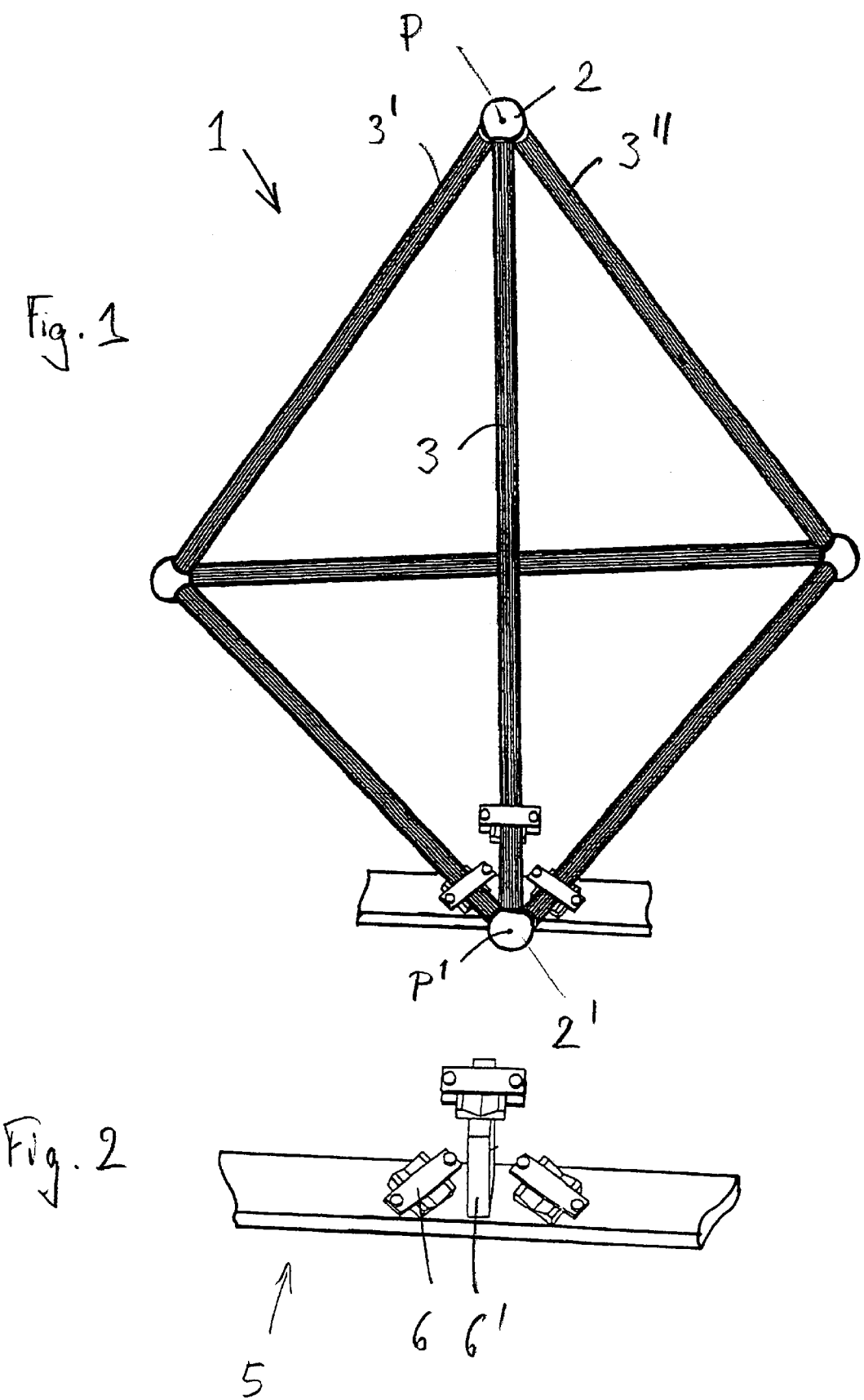

TEST SPECIMEN

CROSS-REFERENCE TO RELATED APPLICATIONS

This is related to prior German Patent Application No. 199 15 012.5, which was filed on Apr. 1, 1999, the rights of priority of which are claimed under 35 U.S.C. §119.

STATEMENT REGARDING FEDERALLY SPONSORED RESEARCH OR DEVELOPMENT

Not applicable.

BACKGROUND OF THE INVENTION

1. Field of the Invention

The present invention relates to a test specimen, such as those normally used for monitoring spatial positioning or measuring systems, especially mobile coordinate measuring systems.

2. Description of the Related Art Including Information Disclosed Under 37 CFR 1.97 and 1.98.

The present invention relates to a test specimen comprising four shaped elements to be sensed or elements to be sensed, which will be referred to as "sensed elements" in the following, and six connection elements, said sensed elements being connected by said connection elements in such a way that each sensed element touches precisely three connection elements at the end faces thereof and that the sensed elements and the connection elements in their entirety form a tetrahedron on the corners of which the sensed elements are arranged.

Such test specimens are normally used for monitoring spatially positioning or measuring systems, especially mobile coordinate measuring systems. The respective test specimens for monitoring these mobile systems must not have a high own weight so that they can be transported to their location of use at an economically acceptable cost.

It will be advantageous when they are also easily demountable.

A test specimen of the type mentioned hereinbefore is known from DE 19720883 or DE 29708830.

The test specimen shown there comprises spherical sensed elements and rodshaped connection elements. The connection elements consist of carbon-fibre composites with unidirectional fibres extending in the longitudinal direction.

It is true that such carbon-fibre composites show a very small coefficient of linear expansion under standard measurement conditions, i.e. at a temperature of −20° C. to +70° C. and a humidity of 0% to 100%; this coefficient of linear expansion is, however, still too large and shows variations over this temperature range and this humidity range which are too strong for guaranteeing precise and reproducible measurement results.

Taking into account the above, it is the object of the present invention to improve the known test specimens in such a way that the measurements obtained with the aid of this test specimen provide results which, under standard measurement conditions, are independent of the ambient conditions.

BRIEF SUMMARY OF THE INVENTION

According to the present invention, this object is achieved by a test specimen of the above-mentioned type which is characterized by the features that the material and/or the dimensions of the sensed elements and the material and/or the dimensions of the connection elements are adapted to one another in such a way that, under standard measurement conditions, the total coefficient of linear expansion from one sensed point to the next sensed point on different sensed elements is essentially zero.

Hence, the present invention provides a test specimen in which the sensed points of the individual sensed elements are positioned at a constant distance from one another in the measurement region in question; said distance can, on the one hand, be determined very precisely by a calibration, whereby absolutely precise measurement results are made possible, and, on the other hand, it is independent of variations of temperature and humidity in the measurement region.

According to a first alternative of the present invention, the sensed elements consist of a material with a positive or a negative coefficient of linear expansion under standard measurement conditions, the connection elements consist of a material with a negative or a positive coefficient of linear expansion under standard measurement conditions, and the dimensions of the sensed elements and the dimensions of the connection elements are adapted to one another in such a way that, under standard measurement conditions, the total coefficient of linear expansion from one sensed point to the next sensed point on different sensed elements is essentially zero.

According to a preferred further development of this first alternative, the material of the sensed elements comprises steel or ceramics and the material of the connection elements comprises a carbon-fibre composite.

Using these materials, it is possible to provide test specimens which have a particularly low weight and which can be transported to their location of use at an economically acceptable cost.

According to a second alternative of the present invention, a test specimen is provided in which the material of the connection elements comprises a glass-ceramic material and the material of the sensed elements comprises steel or ceramic or a glass-ceramic material, whereby the material of the connection elements and the material of the sensed elements are adapted to one another in such a way that, under standard measurement conditions, the total coefficient of linear expansion from one sensed point to the next sensed point on different sensed elements is essentially zero.

Especially the use of glass-ceramic materials, which have been known for a long time, permits the production of connection elements having a very stable length. In view of the infinitely small coefficient of linear expansion of glass-ceramic materials, a very good adaptation of the materials in question is achieved by using connection elements consisting of a glass-ceramic material and sensed elements consisting of materials which are normally used, such as steel or ceramics. This combination already provides a considerable improvement of dimensional stability in comparison with the formed elements known from the prior art.

Hence, a great flexibility of the material of the sensed elements can be achieved by using connection elements consisting of a glass-ceramic material, and it is still guaranteed that the test specimen according to the second alternative shows a considerably improved stability with respect to environmental influences, such as temperature and/or humidity.

The second alternative can be improved insofar as the sensed elements can also be produced from a material with an infinitely small coefficient of linear expansion, such as glass ceramics or metal alloys, e.g. Invar.

A further advantage of the use of a glass-ceramic material is that its sensitivity to humidity is lower than that of a carbon-fibre composite whose coefficient of linear expansion strongly depends on the humidity. An additional treatment of the connection elements, which is necessary in the case of carbon-fibre composites, especially when these composites are intended to be used under wet conditions, can therefore be dispensed with.

Suitable glass-ceramic materials are especially Zerodur or Ceran. One of the metal alloys having an infinitely small coefficient of linear expansion is Invar.

According to a third alternative of the present invention, a test specimen is provided in which the connection elements comprise a first material with a positive coefficient of linear expansion under standard measurement conditions and a second material with a negative coefficient of linear expansion under standard measurement conditions, and the material of the sensed elements comprises steel or ceramic or a glass-ceramic material, the distribution of the first and second materials in the connection element and the material of the sensed elements being adapted to one another in such a way that, under standard measurement conditions, the total coefficient of linear expansion from one sensed point to the next sensed point on different sensed elements is essentially zero.

This third alternative produces in principle the same effect as the second alternative, viz. that the improvement in comparison with the prior art is primarily caused by an increase in the length stability of the connection elements. The increased length stability of the connection elements permits, in turn, a very great flexibility with regard to the selection of the material and the dimensions of the sensed elements, a considerable improvement of the stability of the test specimen with regard to environmental influences, such as temperature and/or humidity, being guaranteed. By simultaneously optimizing the material of the sensed elements, a test specimen can be provided in an advantageous manner with the aid of which extremely precise measurement results can be achieved.

According to a preferred further development, steel can be used as a first material for the connection element and a carbon-fibre composite can be used as a second material for the connection element. By means of these materials a test specimen can be provided, which has a very low weight and which can be transported to its location of use easily and economically.

According to an advantageous further development of all three alternatives, the sensed elements can have a spherical shape; the connection elements can be rodshaped according to an advantageous embodiment.

Due to this special arrangement, a comparatively coarse positioning of the connection elements already results in comparatively precise positions of the sensed elements relative to one another. A further advantage of this arrangement is to be seen in the fact that all four sensed elements are normally accessible by only one sensing pin or measuring pin or tracing pin.

In accordance with an advantageous embodiment, the centres of the spheres of the sensed elements of the above-described preferred development can be located on the extensions of the axes of the rodshaped connection elements. This arrangement supports the above-described advantages.

According to another advantageous further development, the end faces of the connection elements can have a conical shape, preferably a shape that is adapted to the radius of the spherical sensed elements. This has the effect that the positioning accuracy of the sensed elements with regard to the connection elements can be increased still further.

According to a further embodiment of the above-described alternatives, the sensed elements and the connection elements can be connected releasably, e.g. by magnetic forces. This provides a mechanism which permits a particularly simple assembly and disassembly of the test specimen and, consequently, a simplified transport of said test specimen to its location of use.

For establishing the magnetic connection, magnets can be elastically bonded to the ends of the connection elements. This is advantageous insofar as burst effects, especially when materials like ceramic or glass ceramic are used, can be avoided. In the case of this embodiment the sensed elements can consist of a magnetic material or they can be provided with magnets as well.

According to one further development according to the present invention, a large-sized test specimen having a gridlike structure can be formed, which is composed of at least two test specimens according to one of the above-described test specimens, wherein respective neighbouring sensed elements are replaced by one sensed element and respective parallel neighbouring connection elements are replaced by one connection element.

In this way, a grid is formed which is composed of a plurality of adjoining tetrahedrons without any intervals. Each grid point is here occupied by a sensed element. Each sensed element within the grid is coupled with four connection elements, whereas at the grid boundaries each sensed element is coupled with three connection elements.

The advantage of this further development is that it permits the formation of large-sized test specimens with a very high stability.

BRIEF DESCRIPTION OF THE SEVERAL VIEWS OF THE DRAWINGS

Further advantages result from the description of special embodiments of the present invention following hereinbelow in which reference is made to the drawings, in which:

FIG. 1 shows an embodiment of a test specimen according to the present invention; and FIG. 2 shows a holding means for a test specimen according to the present invention.

DETAILED DESCRIPTION OF THE INVENTION

FIG. 1 shows a test specimen according to the present invention designated by reference numeral 1. The test specimen comprises four spherical sensed elements, one of said elements being designated by reference numeral 2 and another one by reference numeral 2'. Furthermore, the test specimen 1 comprises six rodshaped connection elements, three of which are designated by the reference numerals 3, 3' and 3".

Each sensed element 2 is connected to each of the other sensed elements 2' by a connection element 3. If the test specimen is intended to be demountable, a releasable connection can be provided, which is realizable e.g. by magnetic forces. For this purpose, it will be expedient to elastically bond magnets to the ends of the connection elements 3. The sensed elements 2 consist in this case of magnetic material or include magnets as well.

In the embodiment shown, each sensed element 2 contacts precisely three connection elements 3, 3' and 3" at the end faces thereof. It will here be advantageous to implement the end faces of the connection elements as concave end faces. The structure in its entirety is therefore a tetrahedron at the corners of which the sensed elements 2 are arranged.

According to the embodiment shown in FIG. 1, the connection elements consist of a glass-ceramic material, e.g. Zerodur or Ceran. Alternatively, also metal alloys, such as Invar, can be used.

The sensed elements 2 can consist of steel or of ceramics or of a glass-ceramics material.

The mere use of a glass-ceramic material for the connection elements and of the conventional material for the sensed elements already has the effect the test specimen according to the present invention shows a markedly improved stability under standard measurement conditions in comparison with the known test specimens whose connection elements consist of a carbon-fibre composite.

When sensed elements consisting of a glass-ceramic material are used, this effect can be improved still further.

FIG. 2 shows an additional fixing means 5 for the connection elements. This additional fixing means 5, which is advantageous especially in combination with a releasable connection, comprises three connection units 6 and 6' each adapted to be used for securing a respective connection element 3 in position. On the one hand, this permits simple mounting of the test specimen. On the other hand, said fixing means 5 increases the stability of the test specimen. This fixing means can especially also be used instead of the magnetic connection.

In addition, the fixing means may comprise an adjusting means (not shown) with the aid of which the test specimen can be adjusted.

The test specimen according to the present invention, whose connection elements consist of a glass-ceramic material and whose sensed elements consist of ceramics, shows a linear expansion of less than 0.01 $\mu$m/°C. when the tetrahedron has an edge length of one meter. A known test specimen whose connection elements consist of a carbon-fibre composite and whose sensed elements consist of ceramics shows, however, a linear expansion of approx. $-0.12$ $\mu$m/°C.

In addition to the above-described embodiment, a large number of other embodiments making use of the teaching according to the present invention is possible.

According to a further embodiment, which is not shown separately because it utilizes the same structure as the test specimen shown in FIG. 1, the sensed elements 2 can consist of a material having a positive coefficient of linear expansion under standard measurement conditions and the connection elements 3 can consist of a material having a negative coefficient of linear expansion under standard measurement conditions. In this embodiment the dimensions of the sensed elements 2 and the dimensions of the connection elements 3 are adapted to one another in such a way that the positive coefficient of linear expansion of the sensed elements 2 and the negative coefficient of linear expansion of the connection elements 3 counterbalance each other to that the total coefficient of linear expansion will essentially be zero.

In this embodiment the sensed elements can, for example, consist of steel or ceramics, and the material of the connection elements may comprise a carbon-fibre composite.

According to one modification of this embodiment, it is also possible to produce the sensed elements from a material having a positive coefficient of linear expansion under standard measurement conditions and the connection elements from a material having a negative coefficient of linear expansion under standard measurement conditions. Hence, the connection elements may comprise steel or ceramics, whereas the sensed elements consist of a carbon-fibre composite.

According to a further embodiment of the present invention, which is not shown separately because it utilizes the same structure as the test specimen shown in FIG. 1, connection elements 3 may comprise a first material with a positive coefficient of linear expansion and a second material with a negative coefficient of linear expansion under standard measurement conditions. In this embodiment, the distribution of the first and second materials in the connection elements 3 is chosen such that the positive coefficient of linear expansion of the first material and the negative coefficient of linear expansion of the second material counterbalance each other in such a way that the total coefficient of linear expansion will essentially be zero under standard measurement conditions. Since the connection elements 3 have the greatest influence on the distance between two sensed points P, P' on different sensed elements 2, an improved dimensional stability of the test specimen in comparison with the prior art can already be achieved when the connection elements 3 are implemented in this way.

According to an advantageous further development of this embodiment, a residual expansion coefficient of the connection element can additionally be compensated by choosing the material and the dimensions of the sensed elements in suitable manner. This permits a further improvement of the test specimen according to the present invention in comparison with the prior art.

If the connection elements do not show any residual expansion coefficient, sensed elements having an infinitely small coefficient of linear expansion, e.g. glass ceramic, such as Zerodur or Ceran, or metal alloys, such as Invar, will be used in accordance with a further embodiment.

Although the sensed elements of the hitherto described embodiments are spherical in shape, this shape has only been chosen by way of example. Other shapes, such as cubes, rectangular parallelepipeds, tetrahedrons and the like can be used as well.

The same applies to the rodshaped connection elements. Also these elements may have shapes that deviate from the rod-shape.

What is claimed is:

1. A test specimen comprising four sensed elements and six connection elements, wherein the sensed elements are connected by said connection elements such that each said sensed element touches precisely three said connection elements at end faces thereof and such that the sensed elements and the connection elements together form a tetrahedron, on the corners of which the sensed elements are arranged, characterized in that the sensed elements have first respective dimensions and are formed from a first material having a first coefficient of linear expansion, and the connection elements have second respective dimensions and are formed from a second material having a second coefficient of linear expansion, wherein a combination of effects of the first material, the first dimensions, the second material, and the second dimensions results, under standard measurement conditions, in a cumulative coefficient of linear expansion between a first sensed point on a first one of the four sensed elements and a second sensed point on a second one of the four sensed elements that is essentially zero.

2. A test specimen according to claim 1, wherein
the first material has one of a positive coefficient of linear expansion and a negative coefficient of linear expansion under standard measurement conditions,
the second material has the other of a positive coefficient of linear expansion and a negative coefficient of linear expansion under standard measurement conditions, and
based on the coefficients of linear expansion of the first and second materials, the first dimensions and the second dimensions interrelate such that, under standard measurement conditions, the cumulative coefficient of linear expansion between the first sensed point and the second sensed point is essentially zero.

3. A test specimen according to claim 2, wherein the first material includes at least one of steel and ceramics, and the second material includes a carbon-fibre composite.

4. A test specimen according to claim 1, wherein
the second material comprises a glass-ceramic material, and
the first material comprises at least one of steel, ceramic, and a glass-ceramic material,
whereby the second material and the first material have respective coefficients of linear expansion that interrelate such that, under standard measurement conditions, the cumulative coefficient of linear expansion between the first sensed point and the second sensed point is essentially zero.

5. A test specimen according to claim 1, wherein
the second material comprises a first component having a positive coefficient of linear expansion under standard measurement conditions and a second component having a negative coefficient of linear expansion under standard measurement conditions, and
the first material comprises at least one of steel, ceramic, and a glass-ceramic material,
wherein the distribution of the first and second components in the connection element, and the first material of the sensed elements, result in, under standard measurement conditions, a cumulative coefficient of linear expansion between the first sensed point and the second sensed point that is essentially zero.

6. A test specimen according to claim 5, wherein the first component comprises steel and the second material of the connection element comprises a carbon-fibre composite.

7. A test specimen according to claim 1, wherein each of the sensed elements has a spherical shape.

8. A test specimen according to claim 7, wherein each of the connection elements is rod-shaped.

9. A test specimen according to claim 8, wherein the centres of the spherical shapes of the sensed elements are located on extensions of the axes of the rod-shaped connection elements.

10. A test specimen according to claim 1, wherein the end faces of each of the connection elements have a conical shape.

11. A test specimen according to claim 1, wherein the sensed elements and the connection elements are releasably connected together.

12. A test specimen according to claim 11, wherein the releasable connection is provided by magnetic forces.

13. A test specimen according to claim 12, further comprising magnets disposed on the ends of the connection elements.

14. A test specimen according to claim 13, wherein the magnets are bonded to the ends of the connection elements.

15. A test specimen according to claim 14, wherein the magnets are elastically bonded to the ends of the connection elements.

16. A composite test specimen having a lattice structure composed of at least two test specimens according to claim 1, wherein respective adjacent sensed elements are replaced by a single sensed element and respective parallel adjacent connection elements are replaced by a single connection element.

17. A test specimen according to claim 1, wherein the connection elements are rod-shaped.

* * * * *